(12) United States Patent
Cullen

(10) Patent No.: US 7,117,656 B2
(45) Date of Patent: Oct. 10, 2006

(54) APPARATUS AND METHODS FOR BAGGING ORGANIC AND OTHER MATERIALS

(75) Inventor: Steven R. Cullen, Astoria, OR (US)

(73) Assignee: SRC Innovations, LLC, Astoria, OR (US)

( * ) Notice: Subject to any disclaimer, the term of this patent is extended or adjusted under 35 U.S.C. 154(b) by 91 days.

(21) Appl. No.: 11/009,690

(22) Filed: Dec. 10, 2004

(65) Prior Publication Data

US 2005/0120682 A1 Jun. 9, 2005

Related U.S. Application Data

(63) Continuation-in-part of application No. 10/334,484, filed on Dec. 30, 2002, now abandoned.

(51) Int. Cl.
*B65B 1/24* (2006.01)
*B65B 9/06* (2006.01)

(52) U.S. Cl. ............... 53/459; 53/452; 53/568; 53/570; 141/114

(58) Field of Classification Search .......... 53/450, 53/452, 459, 461, 568, 527, 528, 550, 567, 53/570, 576; 100/65, 100, 104, 189; 141/114, 141/231, 314, 317
See application file for complete search history.

(56) References Cited

U.S. PATENT DOCUMENTS

| | | |
|---|---|---|
| 3,237,364 A | 3/1966 | Mack |
| 3,687,061 A | 8/1972 | Eggenmuller et al. |
| 3,996,721 A | 12/1976 | Mercer |
| 4,046,068 A | 9/1977 | Eggenmuller et al. |
| 4,310,036 A | 1/1982 | Rasmussen et al. |
| 4,594,836 A | 6/1986 | Good |
| 4,621,666 A | 11/1986 | Ryan |
| 4,672,794 A | 6/1987 | Good |
| 4,958,477 A | 9/1990 | Winkler |
| 5,113,635 A | 5/1992 | Takai et al. |
| 5,140,802 A | 8/1992 | Inman et al. |
| 5,295,554 A | 3/1994 | Cullen |
| 5,297,377 A | 3/1994 | Cullen |
| 5,355,659 A | 10/1994 | Cullen |
| 5,367,860 A | 11/1994 | Cullen |
| 5,396,753 A | 3/1995 | Cullen |
| 5,398,736 A | 3/1995 | Cullen |
| 5,398,738 A | 3/1995 | Sternheimer et al. |
| 5,400,569 A | 3/1995 | Jones et al. |
| 5,408,810 A | 4/1995 | Cullen |
| 5,419,102 A | 5/1995 | Inman et al. |
| 5,421,142 A | 6/1995 | Cullen |
| 5,425,220 A * | 6/1995 | Cullen .................. 53/527 |
| 5,461,843 A | 10/1995 | Garvin et al. |
| 5,463,849 A * | 11/1995 | Cullen .................. 53/527 |
| 5,464,049 A * | 11/1995 | Cullen .................. 53/527 |

(Continued)

FOREIGN PATENT DOCUMENTS

DE 4012482 10/1991

(Continued)

*Primary Examiner*—Louis Huynh
(74) *Attorney, Agent, or Firm*—Douglas W. McArthur; Snell & Wilmer L.L.P.

(57) ABSTRACT

Apparatus and methods for bagging organic and other material such as silage, compost, grain, sawdust, dirt, sand, etc., wherein plastic material is dispensed from a roll mounted on the bagging machine so that the plastic material is at least partially wrapped around the material being bagged as the bagging machine moves ahead during packing and filling.

22 Claims, 16 Drawing Sheets

U.S. PATENT DOCUMENTS

| | | | |
|---|---|---|---|
| 5,517,806 A * | 5/1996 | Cullen | 53/527 |
| 5,671,594 A * | 9/1997 | Cullen | 53/567 |
| 5,724,793 A | 3/1998 | Inman et al. | |
| 5,775,069 A * | 7/1998 | Cullen | 53/567 |
| 5,784,865 A | 7/1998 | Cullen | |
| 5,799,472 A | 9/1998 | Cullen | |
| 5,857,313 A * | 1/1999 | Cullen | 53/567 |
| 5,878,552 A | 3/1999 | Wingert | |
| 5,894,713 A | 4/1999 | Cullen | |
| 5,899,247 A | 5/1999 | Cullen | |
| 6,443,194 B1 * | 9/2002 | Cullen | 53/527 |
| RE38,020 E * | 3/2003 | Cullen | 53/527 |
| 6,655,116 B1 * | 12/2003 | Cullen | 53/527 |
| 6,694,711 B1 * | 2/2004 | Cullen | 53/527 |
| 6,748,724 B1 * | 6/2004 | Cullen | 53/527 |
| 6,955,030 B1 * | 10/2005 | Cullen | 53/527 |

FOREIGN PATENT DOCUMENTS

| | | |
|---|---|---|
| DE | 10032824 | 1/2002 |
| EP | 1210864 | 6/2002 |

* cited by examiner

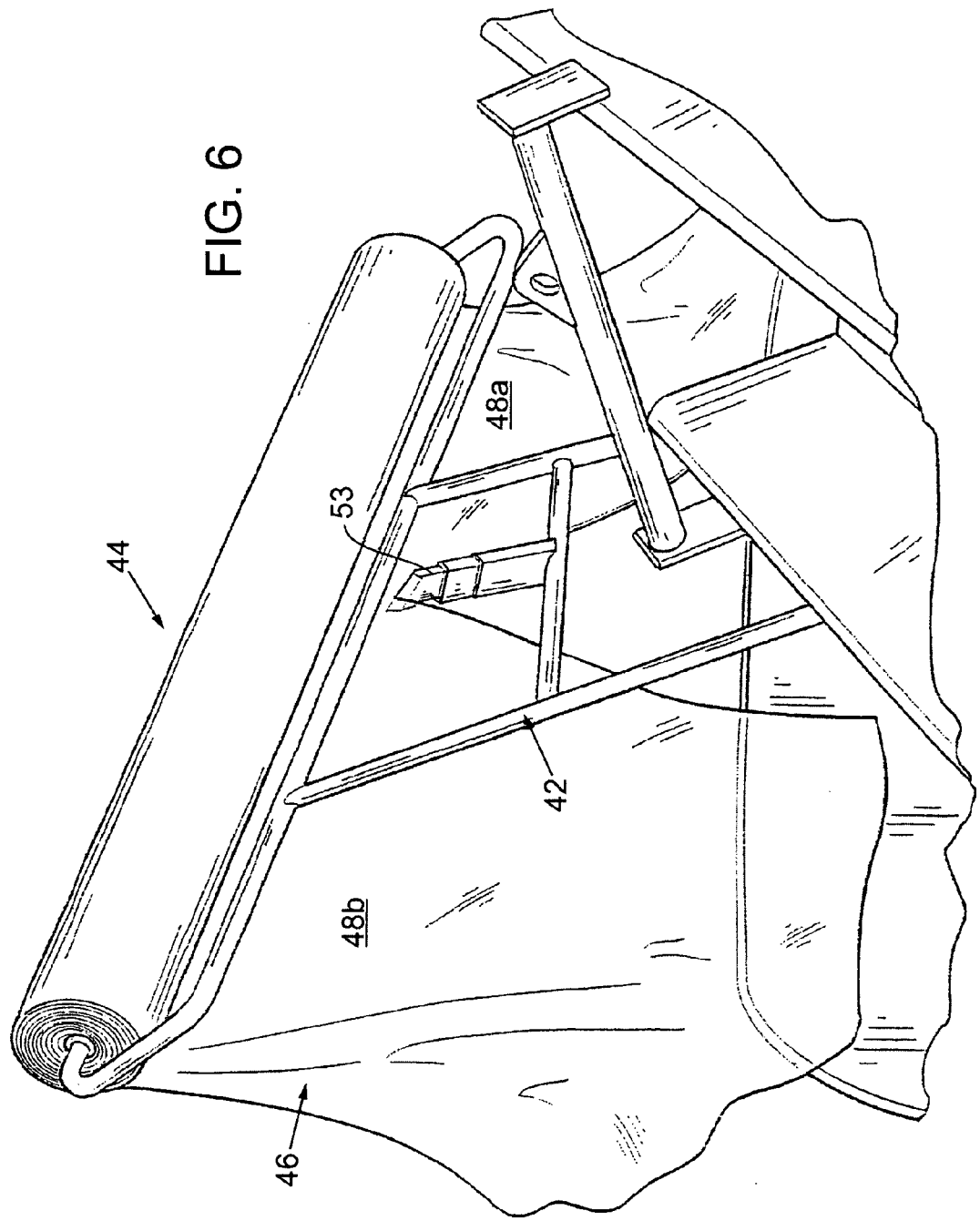

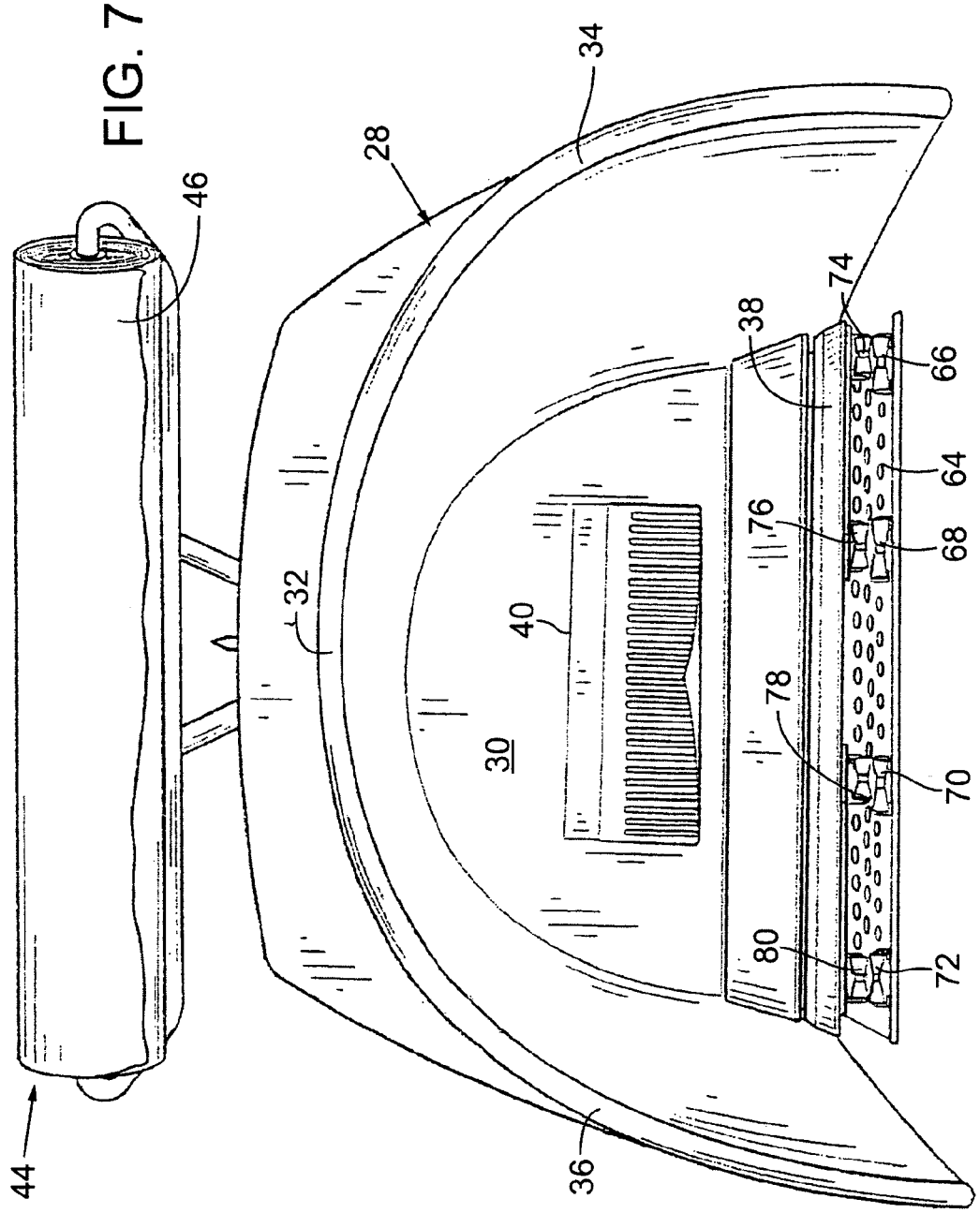

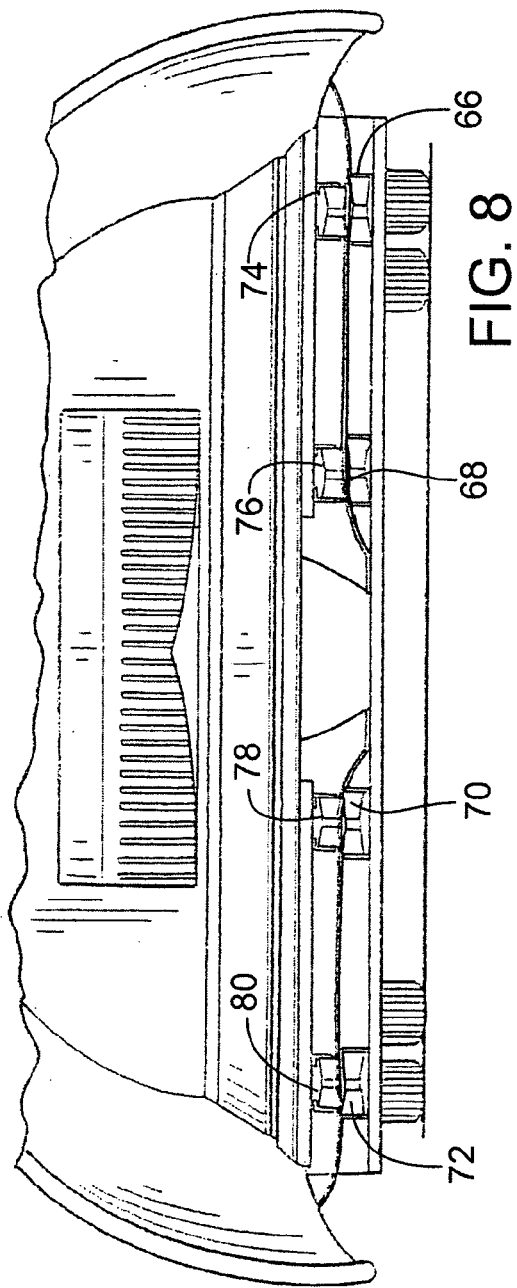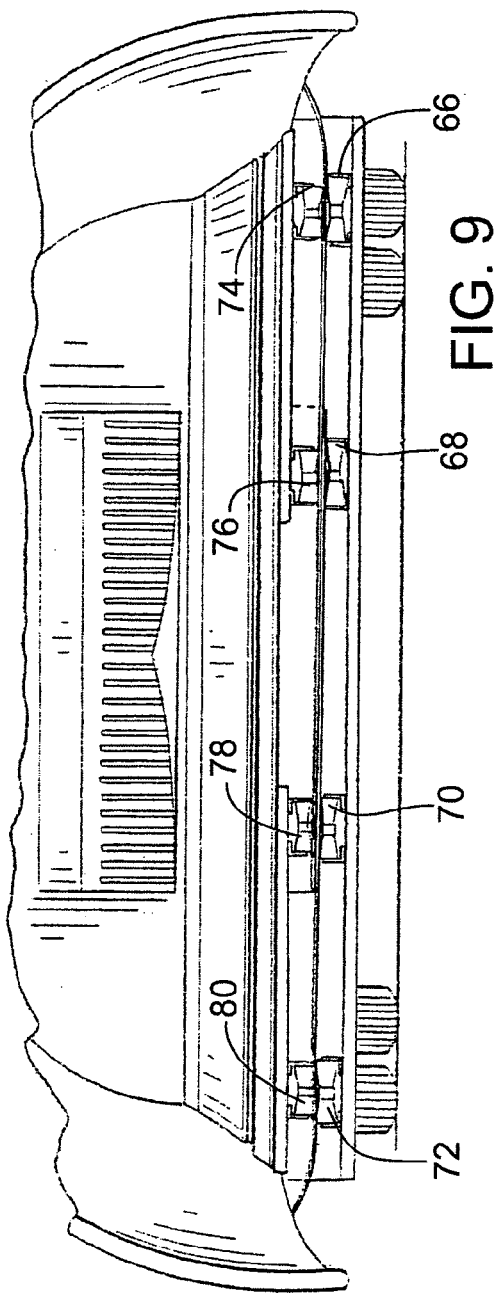

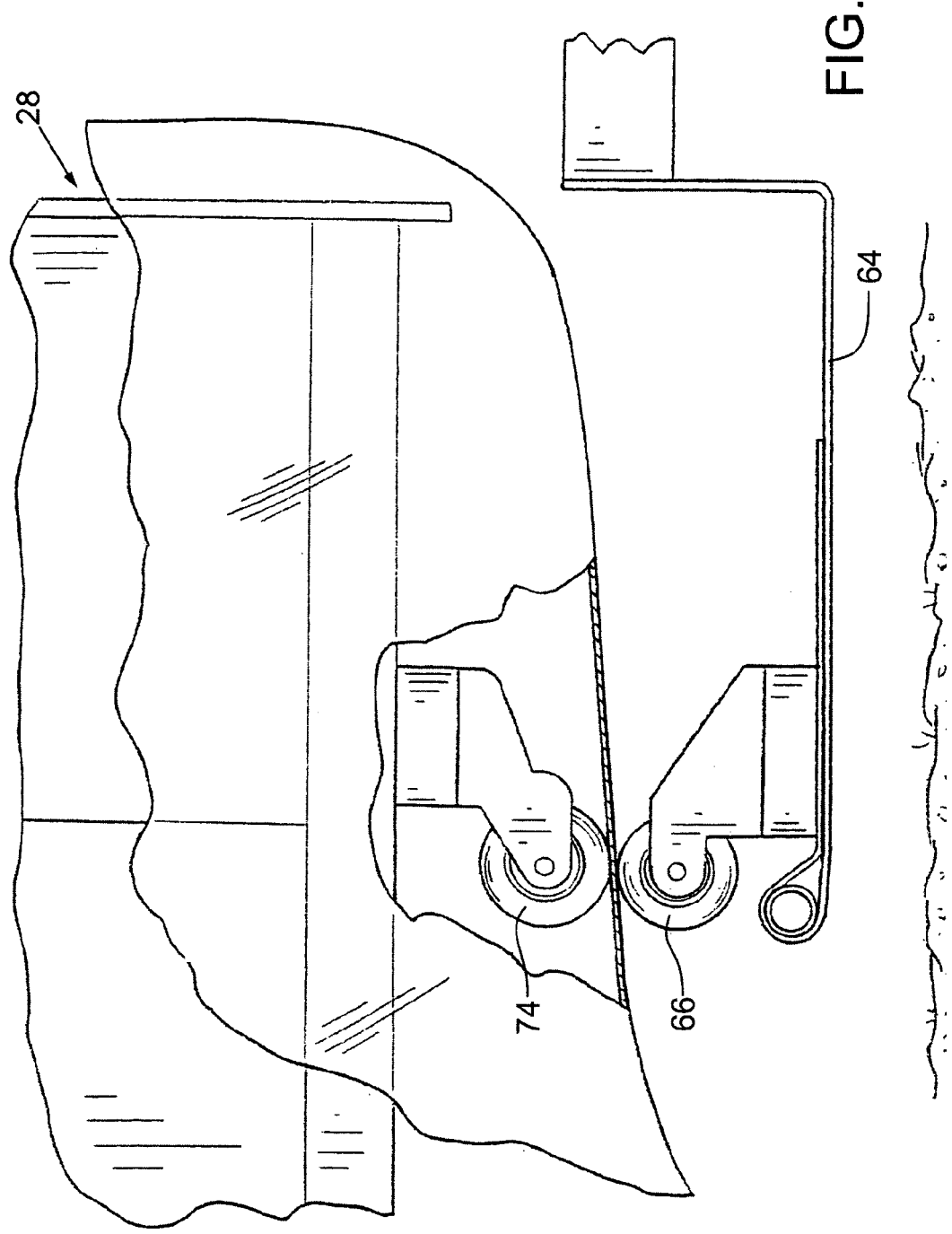

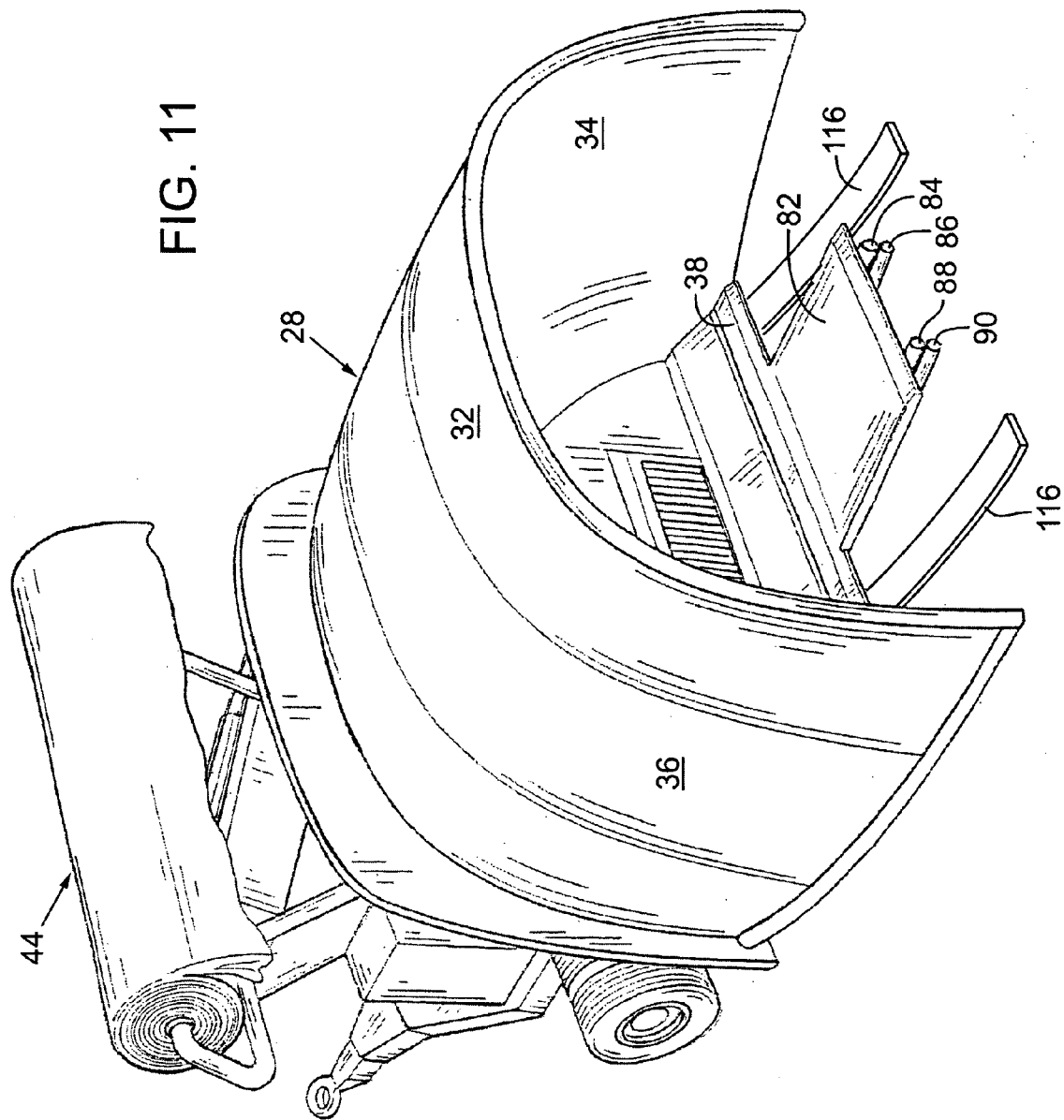

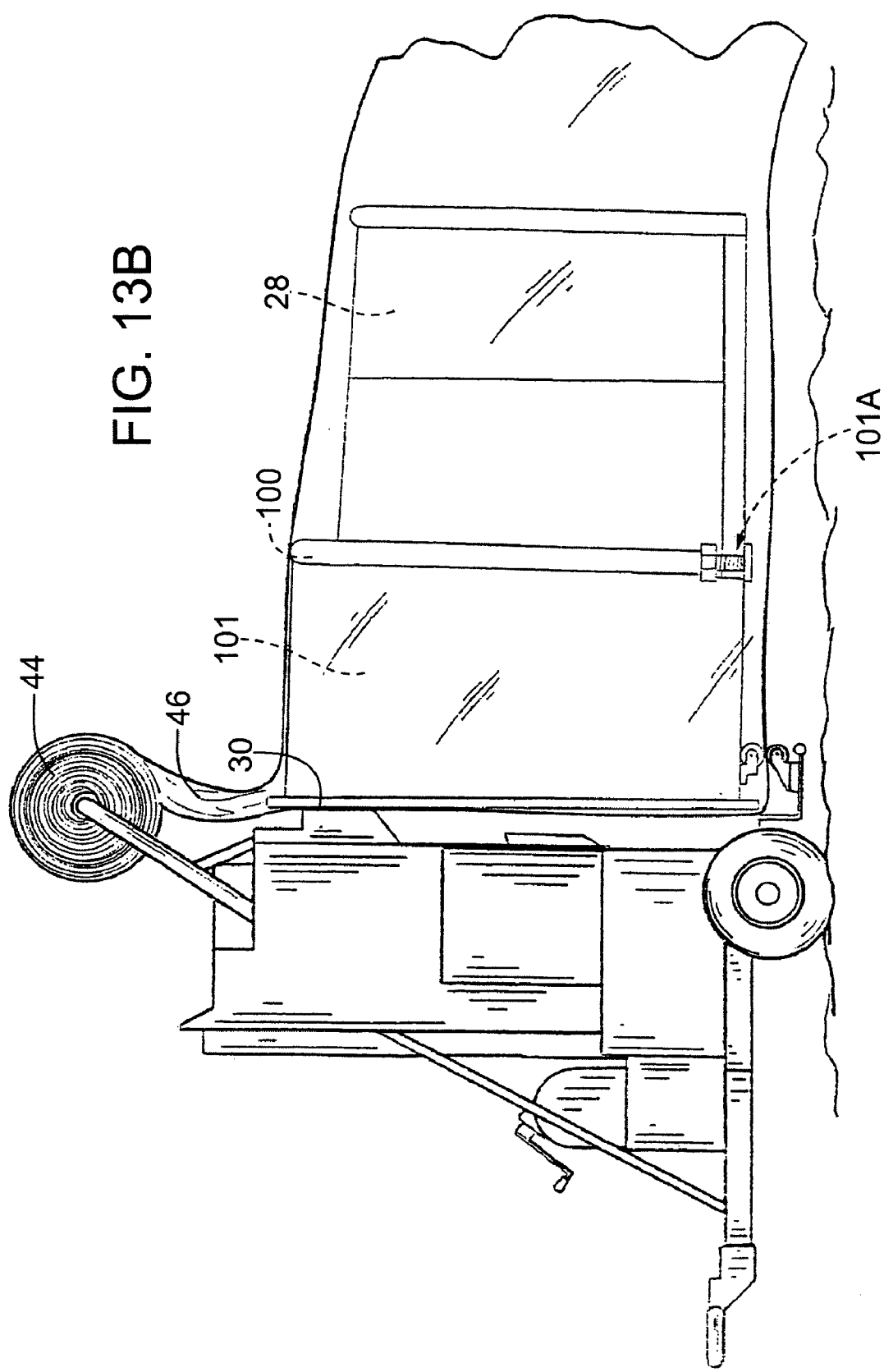

APPARATUS AND METHODS FOR BAGGING ORGANIC AND OTHER MATERIALS

CROSS-REFERENCES TO RELATED APPLICATIONS

This is a continuation-in-part application of U.S. patent application Ser. No. 10/334,484 filed on Dec. 30, 2002, now abandoned; the entire disclosure of which is incorporated herein for all purposes.

TECHNICAL FIELD

This disclosure relates to apparatus and methods for bagging organic and other material such as silage, compost, grain, sawdust, dirt, sand, etc., and more particularly to apparatus and methods for dispensing plastic material from a roll mounted on a bagging machine so that the plastic material is at least partially wrapped around the material being bagged as the bagging machine moves ahead during packing and filling.

BACKGROUND OF THE DISCLOSURE

Agricultural feed and compost bagging machines have been employed for several years to pack or bag silage, compost or the like into elongated plastic bags. Two of the earliest bagging machines are disclosed in U.S. Pat. Nos. 3,687,061 and 4,046,068, the complete disclosures of which are incorporated herein by reference for all purposes. In prior art bagging machines, silage, compost, or the like is supplied to the forward or intake end of the bagging machine and is fed to a packing means such as a rotor, plunger, screw conveyor or the like which conveys the material into a tunnel on which the bag is positioned so that the bag is filled. As the silage is packed into the bag, the bagging machine moves away from the filled end of the bag in a controlled fashion so as to achieve uniform compaction of the silage material within the bag. The empty elongated plastic bags are in a folded condition and are initially positioned over the tunnel or forming means of the machine.

In the present state of the art, the manufacturers of the plastic silage/compost bag must blow or extrude the plastic into a tubular/bag shape, roll it onto a core, fold it into a collar, and then put the same into a box or container, which is palleted for shipping. Once the box is delivered to the field, it may take several men and a crane to lift the bag out of the box and feed it by hand over and onto the tunnel. The bag is then laboriously pushed onto the tunnel until the bag is gathered at the forward end of the tunnel so that the bag is ready for filling and packing.

A major disadvantage and cost of the current method of manufacturing plastic bags for use on bagging machines is the sophisticated and expensive machinery required by the manufacturers to fold the bags after the blowing or extruding process. Only a few manufacturers have such costly machines, and they pass the processing and material costs onto the end user. Secondly, the extra steps necessary to convert the roll of plastic into bags, fold the bags into boxes, load the individual boxes into a larger container for shipping, and then transport and deliver those boxes to the consumers adds time, packaging, space requirements, handling equipment, manpower and disposal costs to the entire process.

A further problem created by the present method of putting a plastic bag onto a bagging machine is the physical strain and danger to the men who load the bag onto the tunnel. The newer, bigger bags (14'×500') weigh up to 1200 lbs and the industry trend is for even larger tunnels and even longer bags.

There is a need to replace the old process of manufacturing the bags and the installation of the same on the bagging machines to reduce manufacturing and handling costs, improve safety and worker ergonomics, and eliminate the stranglehold a few manufacturers have on bag distributors and consumers.

SUMMARY OF THE DISCLOSURE

Apparatus and methods for bagging organic and other material such as compost, silage, grain, sawdust, dirt, sand, etc., are described. The method of bagging the material comprises the steps of: (1) providing a mobile bagging machine having rearward and forward ends, a material receiving means at the forward end thereof, a material packing means in communication with the material receiving means, and a rearwardly extending material forming or shaping enclosure, which may be in the form of a tunnel having an upper end, opposite sides and a lower end; (2) positioning a roll of flexible plastic material on the bagging machine; and (3) causing the plastic material to unroll from the roll, as material is forced through the tunnel, and to pass around the tunnel to partially or completely enclose the material being discharged from the tunnel. The plastic material forms a bag-like enclosure in which the material is placed. Optionally, the method may include the step of controlling the packing density of the material being bagged.

As used herein, the term "bag" refers to a flexible container or enclosure which extends partially around or completely around material to partially or completely enclose the same. The apparatus for performing the method comprises a mobile frame having rearward and forward ends; a material receiving means on the mobile frame means; a material packing means on the mobile frame means in communication with the material receiving means; a rearwardly extending material forming or shaping enclosure, which may be in the form of a tunnel, in communication with the material packing means; and a roll of flexible plastic material mounted on the mobile frame means. Optionally, the apparatus further includes a density control assembly operatively coupled to the bagging machine. The plastic material is pulled from the roll as the bagging machine moves forwardly during the bagging operation. The plastic material passes partially or completely around the tunnel to at least partially enclose the material being discharged from the tunnel. Various means for causing the plastic material to pass around the tunnel and at least partially beneath the tunnel are disclosed.

BRIEF DESCRIPTION OF THE DRAWINGS

FIG. 6 is a front perspective view of a slitter operatively coupled to the bagging machine;

FIG. 7 is a rear view of the bagging machine illustrating an example of a plastic material guide assembly;

FIG. 8 is a rear view of the bagging machine illustrating the side edges of the plastic material being spaced apart;

FIG. 9 is a view similar to FIG. 8 except that the side edges of the plastic material have been overlapped;

FIG. 10 is a partial side view illustrating the manner in which the plastic material is passed through the guide assembly;

FIG. 11 is a rear perspective view illustrating an example of the guide assembly;

FIG. 13B is a side view of the embodiment of FIG. 13A;

DESCRIPTION OF THE PREFERRED EMBODIMENT

Figure 1:
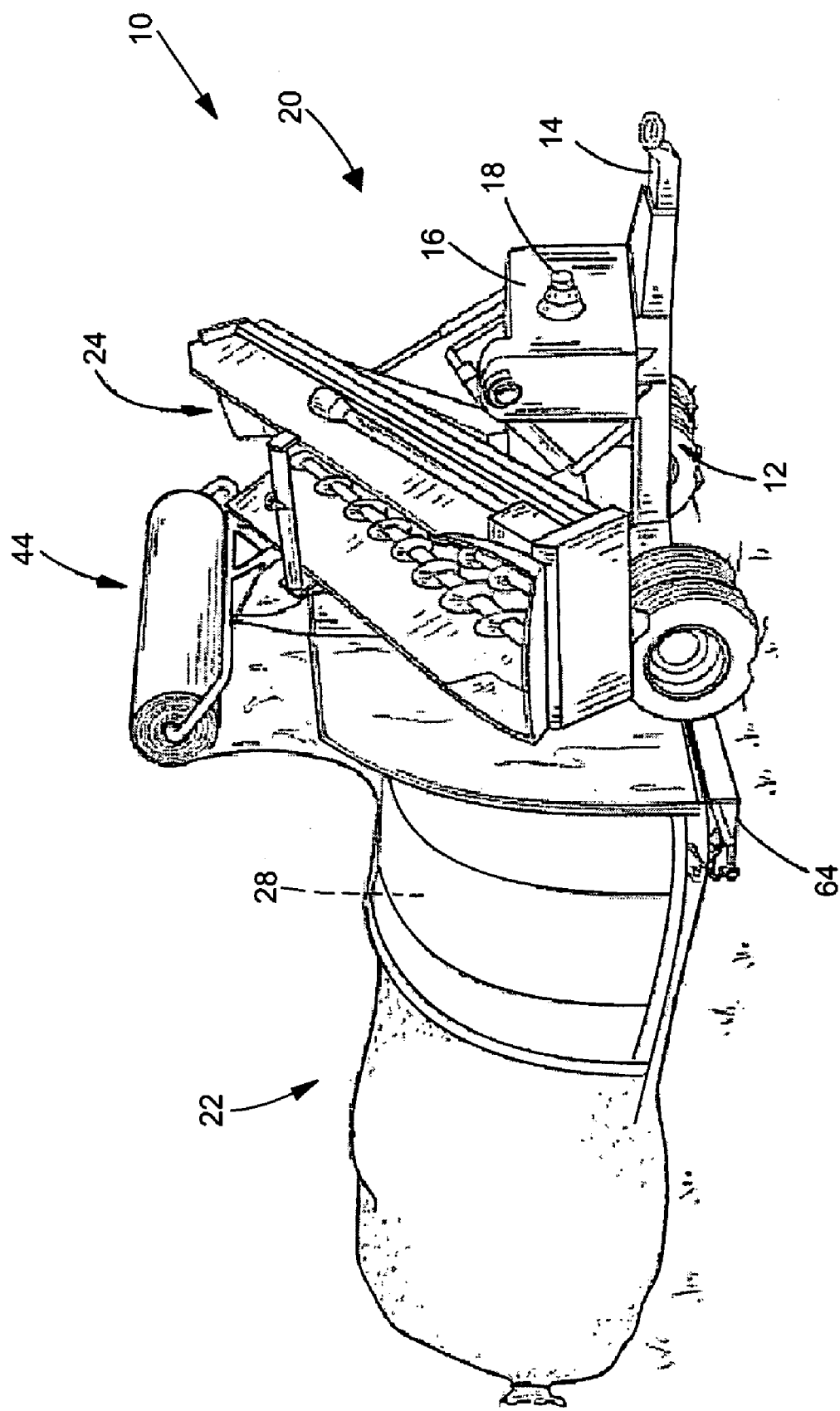
FIG. 1 is a front perspective view of a bagging machine having a roll of plastic material mounted thereon with the plastic material being pulled from the roll to at least partially enclose the material being bagged.

Referring to FIG. 1, the numeral 10 refers to a bagging machine such as manufactured by Versa Corporation, Astoria, Oreg. The bagging machine is intended to bag organic material such as compost, silage, grain, sawdust, etc., within a bag. The machine 10 may also be used to bag dirt or sand to create temporary dikes during flooding. Machine 10 is seen to include a wheeled frame 12 having a forwardly extending tongue or hitch 14 adapted to be connected to a prime mover such as a tractor, truck, etc. Gear box 16 is provided on frame 12 and is driven by a PTO shaft 18 connected to the PTO on the tractor. Although frame 12 shown in the drawings is wheeled, it is possible that the wheels could be omitted. Further, the machine 10 could be truck mounted such as seen in U.S. Pat. No. 5,784,865. Additionally, the machine 10 could be self propelled such as illustrated in U.S. Pat. No. 5,799,472. The complete disclosures of both of the above-identified patents are hereby incorporated by reference for all purposes. For purposes of description, machine 10 will be described as having a forward end 20 and a rearward end 22.

Machine 10 is provided with a material receiving means 24 at its forward end which may be in the form of: (1) a feed table such as seen in U.S. Pat. No. 5,297,377; (2) a hopper such as seen in U.S. Pat. No. 5,398,736; (3) a feed mechanism such as shown in U.S. Pat. No. 5,396,753; (4) a feed mechanism such as shown in U.S. Pat. No. 5,367,860; or (5) a hopper such as seen in U.S. Pat. Nos. 5,140,802; 5,419,102; and 5,724,793. The complete disclosures of the above-identified patents are hereby incorporated by reference for all purposes. The purpose of the material receiving means is to receive the material to be bagged and deliver the same to a material packing means 26 positioned at the forward end of a material shaping or forming enclosure 28.

The material packing means may be: (1) a rotor such as shown in U.S. Pat. Nos. 5,396,753; 5,297,377; 5,799,472; 5,295,554; (2) a screw conveyor such as seen in U.S. Pat. Nos. 5,140,802 or 5,419,102; (3) a plunger such as seen in U.S. Pat. No. 5,724,793; or (4) the packing fingers described in U.S. Pat. No. 3,687,061. The complete disclosures of the above-identified patents are hereby incorporated by reference for all purposes.

With reference to FIG. 7, the material forming or shaping enclosure is illustrated as a tunnel 28. The size (diameter) of the tunnel 28 will depend on the desired bag diameter. The tunnel 28 may be semi-circular or substantially semi-circular. For example, the tunnel may have vertical straight portions on the opposing sides connected by an arcuate portion on the top. Alternatively, the tunnel may be formed from one or more arcuate portions having the same or different radii of curvature. As used herein, "diameter" refers to the distance between opposing interior surfaces of the tunnel, whether semi-circular or substantially semi-circular.

With continued reference to FIG. 7, a face plate 30 may be secured to the forward end of the tunnel with the face plate 30 being secured to the frame of the machine. In some machines, the face plate is permanently mounted on the machine with the tunnel being secured to the face plate. Various tunnels are shown in U.S. Pat. Nos. 5,899,247; 5,396,753; 5,297,377; 5,799,472; 5,398,736; 5,355,659; 5,295,554; 5,140,802; 5,419,102; 5,421,142; 5,724,793; and 5,894,713. The complete disclosures of the above-identified patents are hereby incorporated by reference for all purposes. Normally, the tunnel 28 will include a top wall 32, side walls 34 and 36, and at least a partial bottom wall 38. Face plate 30 may include an opening 40 through which the material passes to the interior of the tunnel when a rotor is utilized as the packing means. If plungers, screw conveyors, etc., are utilized as the packing means, the face plate may or may not be included and opening 40 will be omitted.

While not required, bagging machines 10 of the present disclosure may also include a density control assembly. A density control assembly as used herein refers to structures or devices that are coupled to the bagging machine and used to control or adjust the packing density of the material be packed into the bag. A variety of density control assemblies and methods may be implemented with the bagging machine of the present disclosure some examples of which include backstop control systems, internal control systems, and drag resistance control systems.

In early bagging machines, a backstop structure yieldably engaged the closed end of the agricultural bag to resist the movement of the bagging machine away from the filled end of the agricultural bag as silage is forced into the bag. These machines included a pair of drums rotatably mounted on the bagging machine with a brake associated therewith for braking or resisting the rotation of the drum with a selected brake force. A cable is wrapped around the drum and is connected to the backstop. Examples of such bagging machines are disclosed in U.S. Pat. Nos. 3,687,061 and 4,046,068, previously incorporated by reference.

Figure 13A:
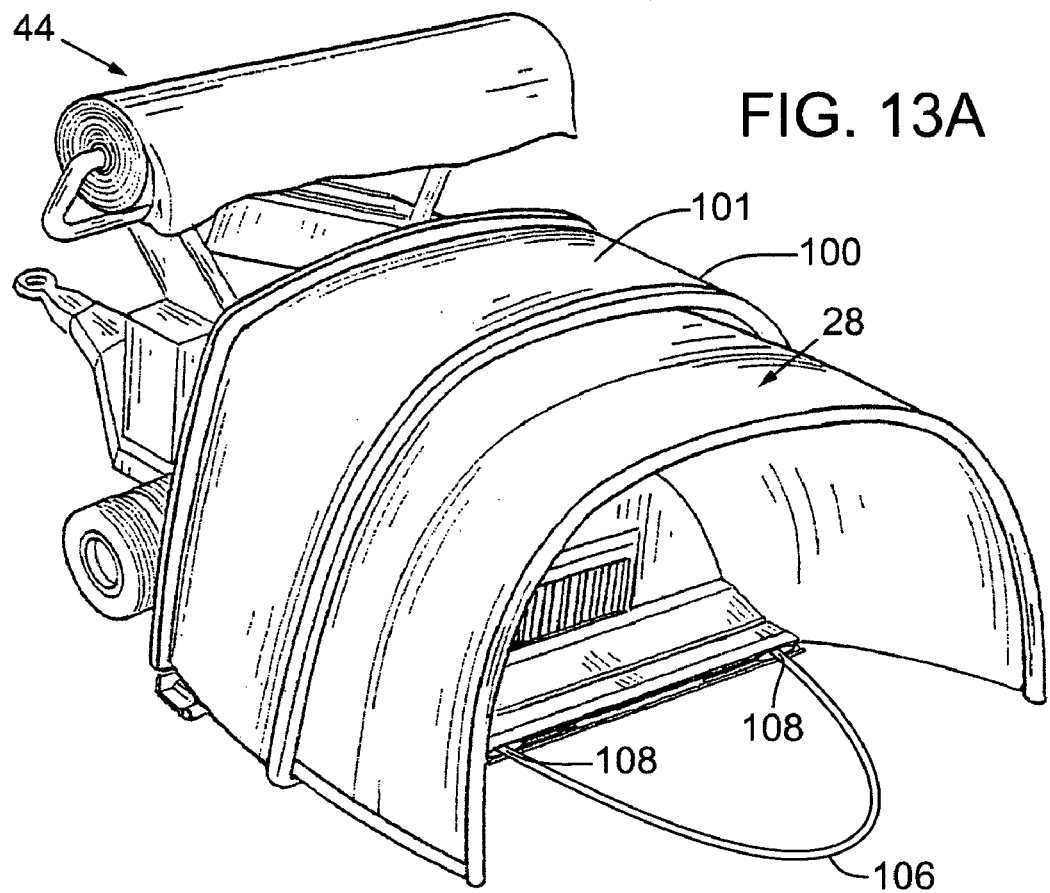
FIG. 13A is a partial rear perspective view of a bagging machine including an apparatus for adjusting the size of the bag formed by the plastic material as it passes around the tunnel.

In more recent bagging machines, an internal density control assembly including one or more cables was positioned in the flow of the agricultural material being bagged. In order to vary the packing density of the material in the machine, more or less cables would be employed based on the material being packed. For example, corn silage flows easy and would require more cables while alfalfa packs hard and would use fewer cables. One example of such an arrangement is shown in FIG. 13A where a cable loop 106 is formed with the ends 108 thereof coupled to the tunnel 28. The configuration of cable loop shown in FIG. 13A is one of many cable loop configurations within the scope of the present disclosure. For example, more than one cable loop may be used. Additionally, the ends 108 of the cable loop may be coupled to the inside or the outside of the tunnel 28, may be coupled to the face plate, may be coupled to the bagging machine with an assembly for adjusting the width or length of the loop, may be coupled to the bagging machine in a non-parallel pattern where two or more of the cable loops cross each other, or may be coupled to the bagging machine with an anchor coupled to the rearward portion of the loop. Examples of these and other alternative configurations are disclosed in U.S. Pat. Nos. 5,297,377; 5,425,220; 5,463,849; 5,464,049; 5,517,806; 5,671,594; 5,775,069; 5,671,594; 5,857,313; and 6,694,711, the complete disclosures of which are hereby incorporated by reference for all purposes.

Figure 14A:
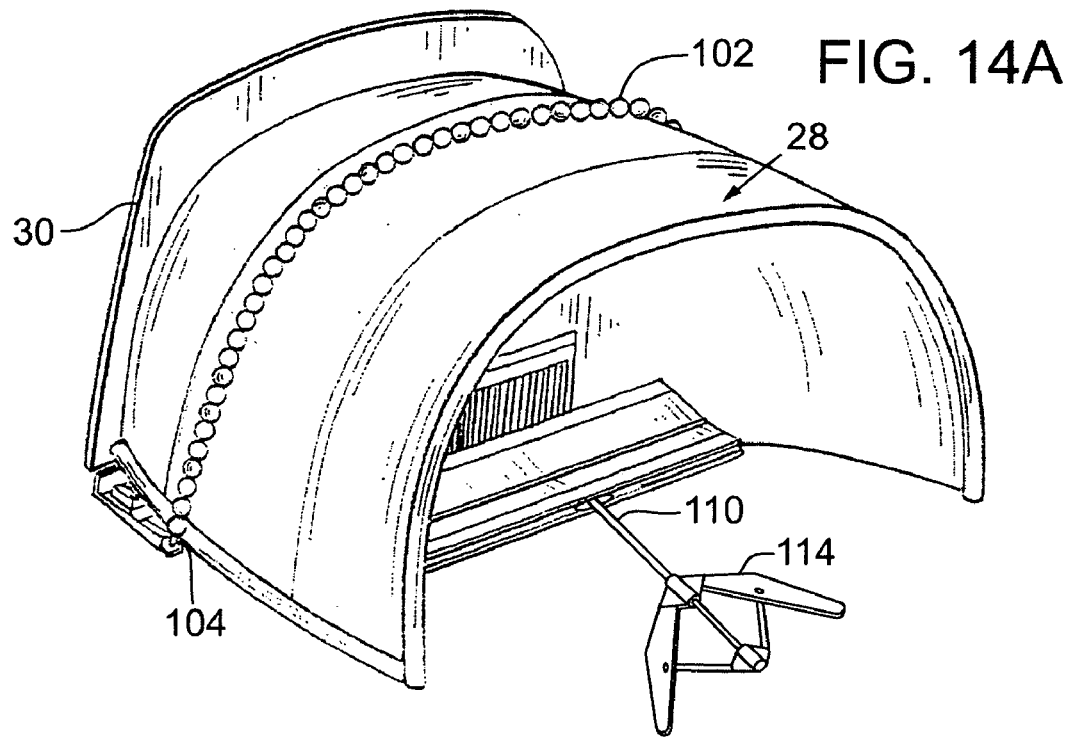
FIG. 14A is a rear perspective view of a bagging machine including an apparatus for smoothing out the plastic material as it passes around the tunnel.

Other arrangements have been used to control the packing density of the material being packed into the bag, one example of which is shown in FIG. 14A where a single cable 110 extends rearwardly from the bagging machine 10 and includes an anchor disposed at the rearward end 112. The length of the cable 110 behind the bagging machine 10 may be fixed or adjustable. It is within the scope of the present disclosure that more than one cable can be used with or without anchors. When an anchor is coupled to the rearward end 112 of the cable 110, the size and configuration of the anchor may be fixed or adjustable. In the example shown in FIG. 14A, the V-shaped anchor 114 may be adjustable to have a greater or smaller angle between the arms of the V. Alternatively, an inflatable anchor may be used that can expand or contract as needed or a screw anchor may be used. Examples of these and other alternative configurations are disclosed in U.S. Pat. Nos. 6,655,116; 6,443,194; and RE38,020, the complete disclosures of which are hereby incorporated by reference for all purposes.

More recently, drag resistance density control assemblies have been developed using belts or straps disposed between the bagged material and the ground. In these embodiments, a drag member, such as one or more belts or straps, is attached to the bagging machine or the tunnel and extends rearwardly behind the tunnel. The drag member is positioned between the bagged material and the ground and may be disposed inside the bag or outside the bag. The weight of the bagged material on the drag member slows the advance of the bagging machine and increases the packing density of the agricultural material in the bag. The packing density of the material in the bag may be established prior to beginning the bagging operation or may be adjusted as the bag is being filled. The packing density is established or adjusted, at least in part, by controlling the amount of drag member surface area disposed under the weight of the bagged material. Density control assemblies for agricultural bagging machines that include drag members are disclosed in U.S. Pat. No. 6,748,724 and U.S. Pat. No. 6,955,030. The complete disclosures of the above-identified patents are hereby incorporated by reference for all purposes. One example of a drag member 116 coupled to a bagging machine is illustrated in FIG. 11.

Figure 2:
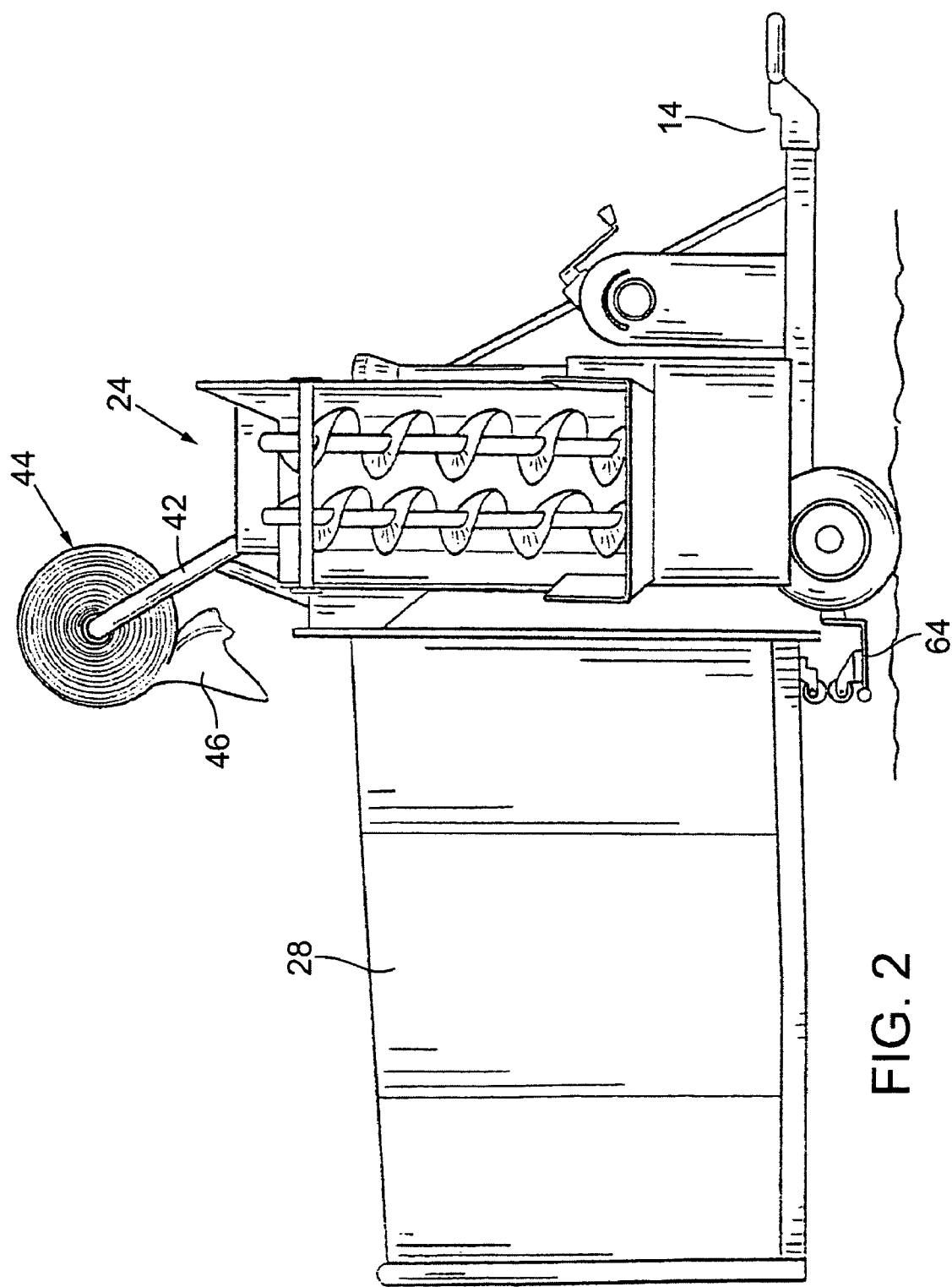
FIG. 2 is a side view of a bagging machine having a roll of plastic material mounted above the tunnel.
Figure 3:
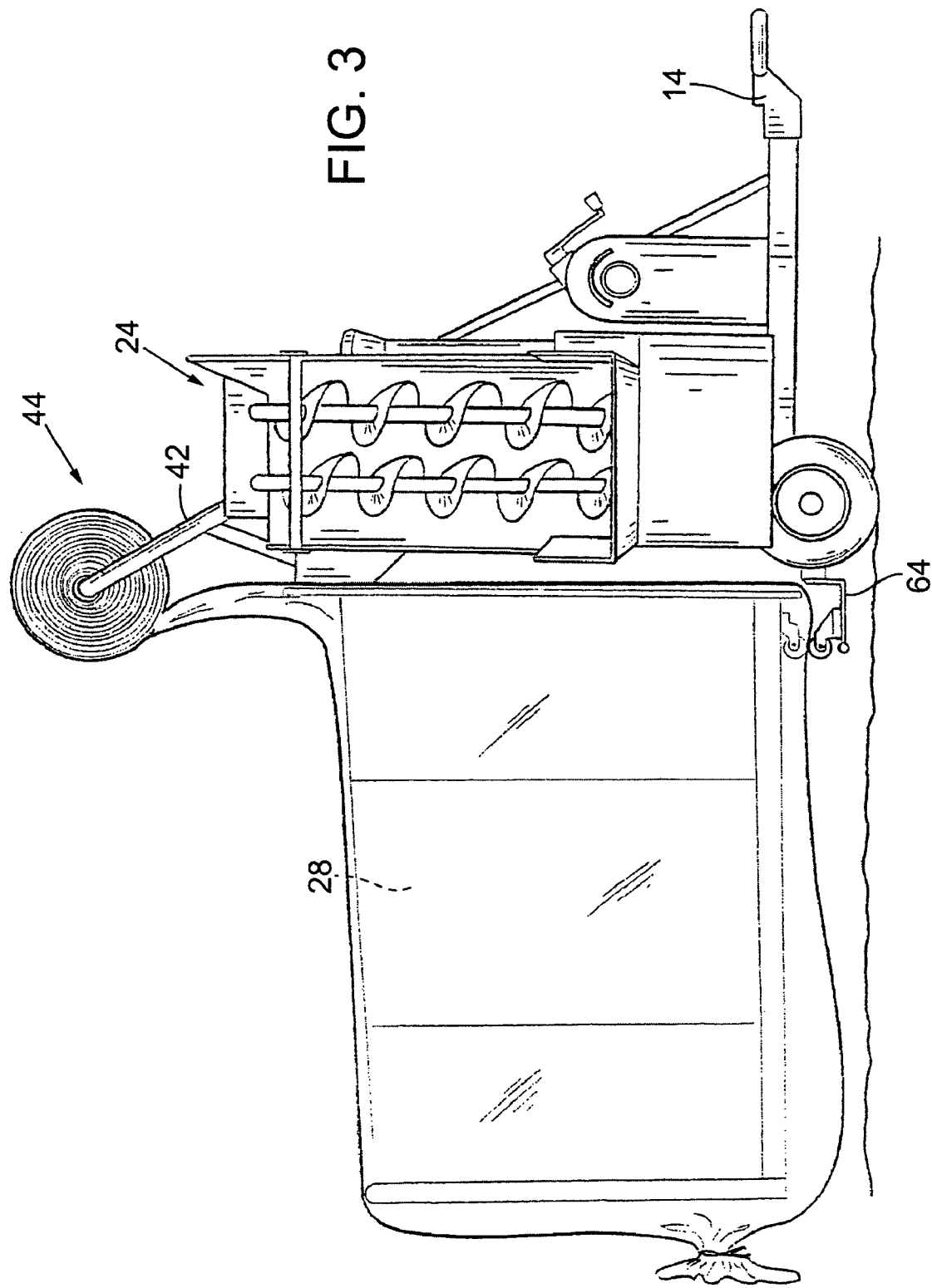
FIG. 3 is a view similar to FIG. 2 except that the roll of plastic material has been extended around the tunnel.

With reference to FIGS. 2 and 3, a support 42 is secured to the machine 10 and extends upwardly therefrom adjacent the forward end of the tunnel 28 for rotatably supporting a roll 44 of plastic material 46 thereon. The plastic material 46 is dispensed from a roll 44 mounted on the bagging machine so that the plastic material 46 is at least partially wrapped around the agricultural material being bagged as the bagging machine moves ahead during packing and filling. The plastic material 46 is pulled from the roll 44, as shown in FIG. 2, and is positioned around the tunnel 28 and at least partially beneath the tunnel so that the plastic material 46 forms a bag-like enclosure, as shown in FIG. 3.

The roll 44 may be disposed above the tunnel 28 as shown in FIGS. 1–3 and may alternatively be disposed at other locations on the machine 10. Additionally, the roll 44 may be enclosed in a housing or canister. It is also within the scope of the present disclosure that the plastic material could be dispensed from a source such as a box or container much like garbage bags are dispensed.

The flexible plastic material of the present disclosure may be disposed on the roll either as a sheet having opposing ends and opposing side edges or as an elongate tube. The sheet of plastic material having opposing ends and opposing side edges may be formed by slitting an elongate tube prior to rolling the plastic material onto the roll or by slitting an elongate tube as the material is being rolled onto the roll.

Figure 4:
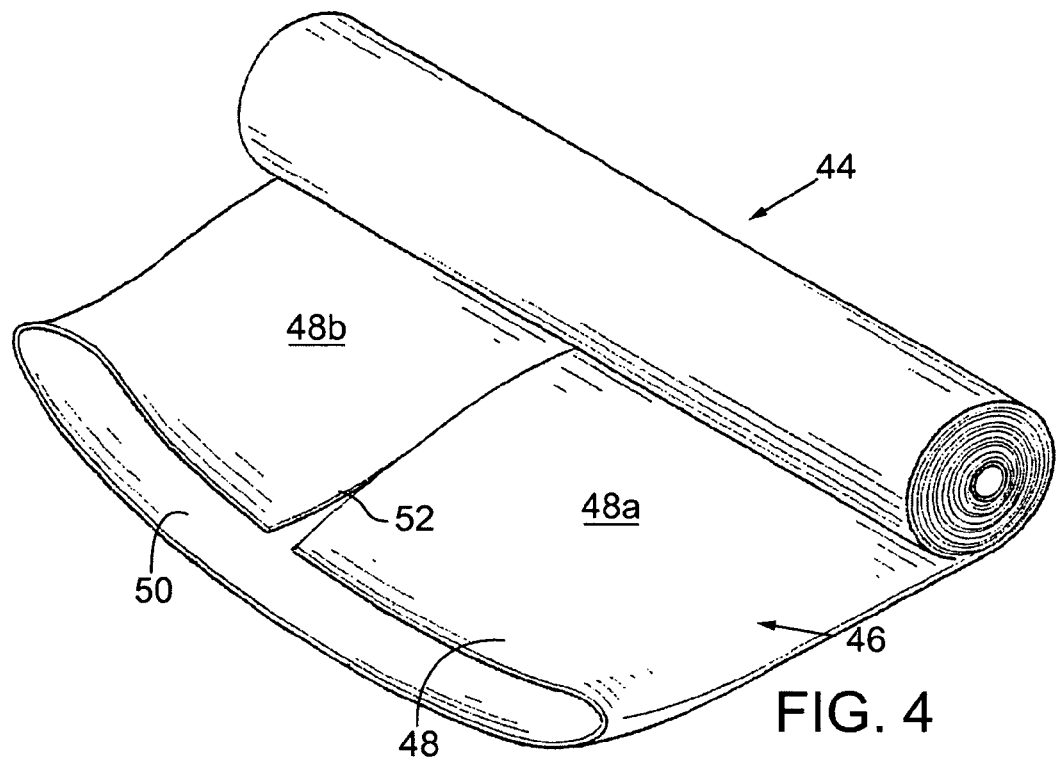
FIG. 4 is a perspective view of one form of the plastic material.
Figure 5:
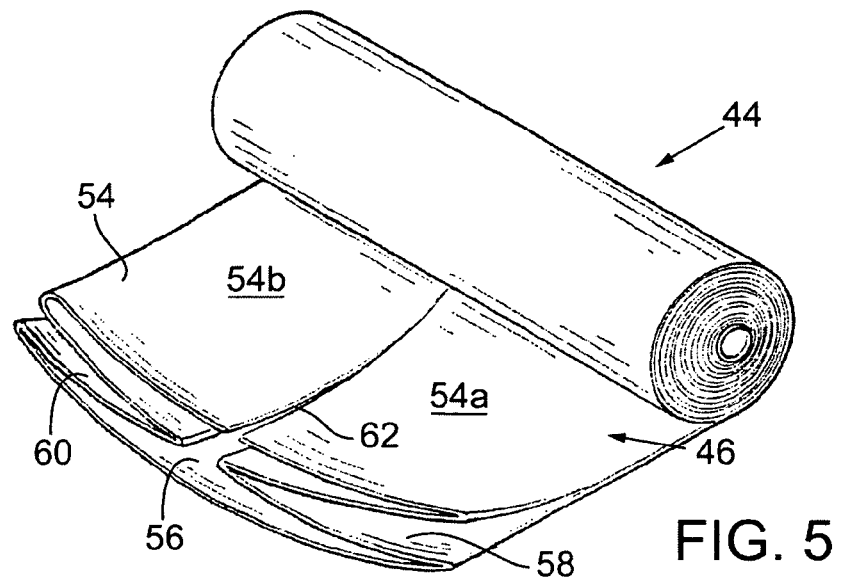
FIG. 5 is a perspective view of another form of the plastic material.

When the plastic material 46 is a sheet, the sheet may be folded in a tube-like shape such as seen in FIGS. 4 and 5. The plastic material 46 in FIG. 4 is what would be termed a single fold including a front layer 48 and a back layer 50. The front layer may be slit at 52 at the factory to form front layer portions 48a and 48b. The plastic material 46 on roll 44 may also be multi-layered, such as seen in FIG. 5, with a front layer 54, back layer 56, and side gusset layers 58 and 60 therebetween. Similar to the single fold shown in FIG. 4, front layer 54 may be slit at 62 at the factory to form front layers 54a and 54b.

When the flexible plastic material is disposed on the roll as an elongate tube, the tube may be slit as the plastic material is unrolled and positioned around the tunnel. A slitting device may be provided on support 42 or on machine 10 to slit the elongate tube. In some embodiments, the slitting device may slit the front layer as shown in FIGS. 4 and 5. One example of a slitting device 53 disposed on support 42 is shown in FIG. 6.

A pan 64 or other suitable support may be positioned below the forward end of the tunnel 28 as shown in FIGS. 1–3. With reference to FIG. 7, the pan 64 may have rollers 66, 68, 70 and 72 rotatably mounted thereon. Although four rollers are illustrated, more or less rollers could be utilized. Rollers 74, 76, 78 and 80 are rotatably mounted on the underside of floor 38 of tunnel 28 or other suitable support above rollers 66, 68, 70 and 72, respectively. Referring to FIG. 10, the peripheries of the corresponding rollers may be disposed in operative engagement with each other such that the flexible plastic material is allowed to pass therebetween and is moved in accordance with movement of the rollers. Although four rollers are illustrated, more or less rollers could be utilized. The number of rollers on the underside of floor 38 will correspond to the number of rollers on pan 64. In some embodiments, the rollers 74, 76, 78 and 80 may be angled inwardly somewhat with respect to the centerline of the tunnel so as to guide the plastic material 46 inwardly towards the centerline of the tunnel as will be described in greater detail hereinafter.

Figure 17:
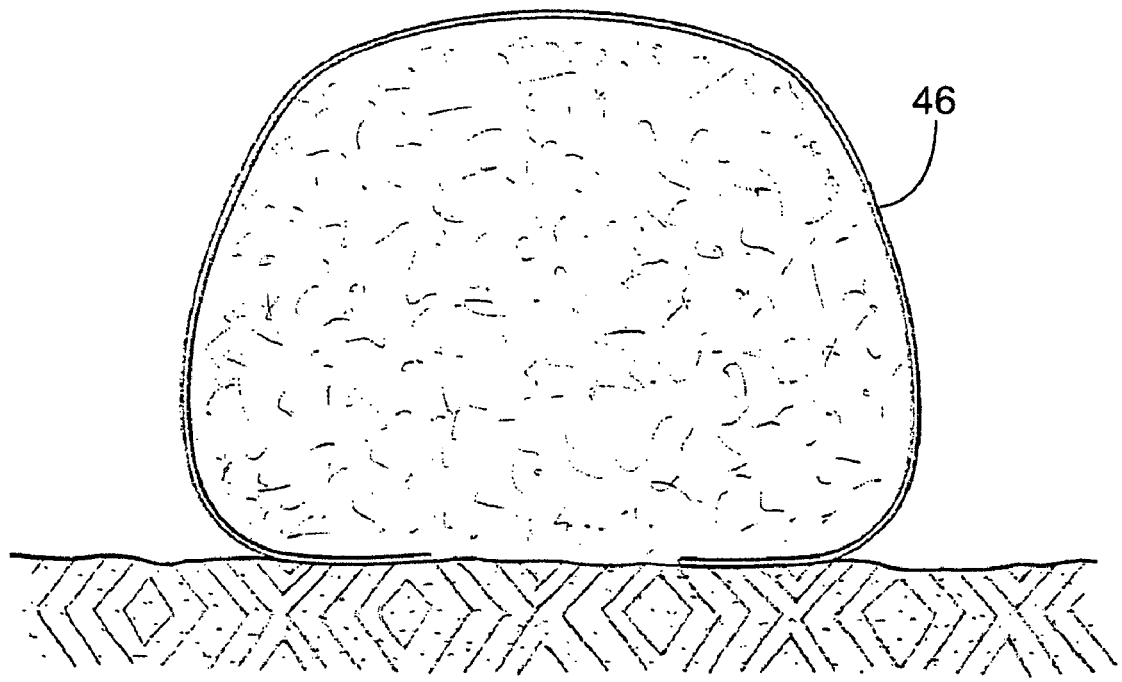
FIG. 17 is a sectional view illustrating the material having been partially enclosed in the plastic material.
Figure 18:
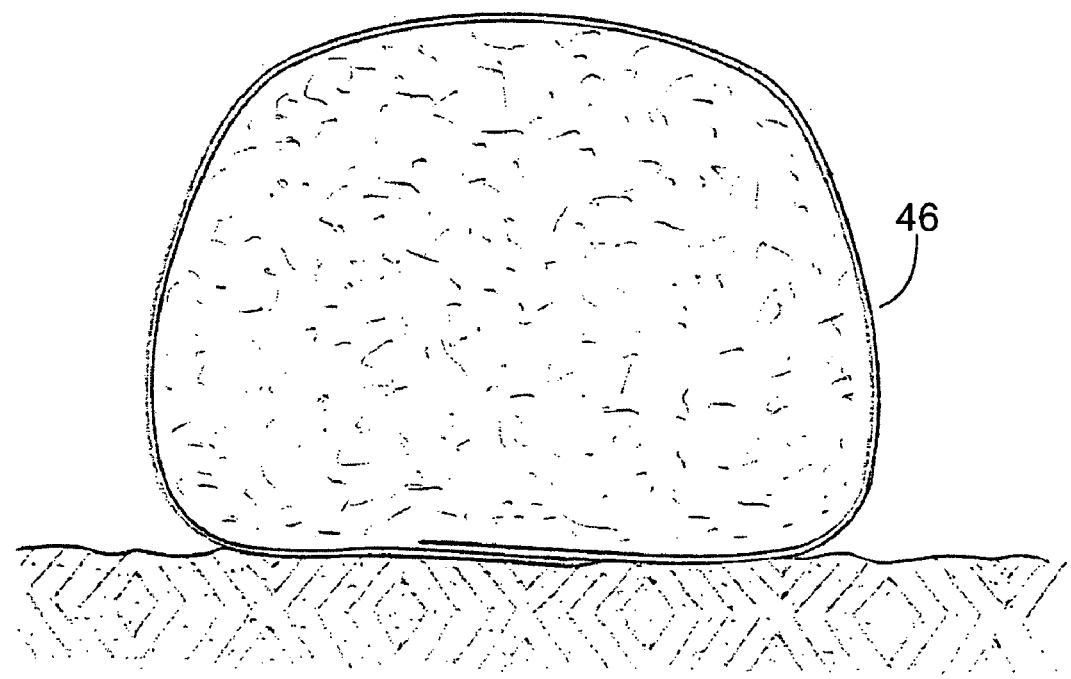
FIG. 18 is a view similar to FIG. 17 except that the material has been completely enclosed within the plastic material.

As can be seen in FIGS. 8 and 9, the flexible plastic material is positioned around the tunnel with the opposing side edges of the plastic material disposed underneath the tunnel. In FIG. 8, the opposing side edges are shown as being disposed in a spaced-apart relationship. When the agricultural material is packed into the bag formed by the configuration in FIG. 8, the opposing side edges will be disposed between the bagged material and the ground with the ground surface closing the bag, such as shown in FIG. 17. In FIG. 9, the opposing side edges overlap and completely enclose the material being bagged. FIG. 18 illustrates a cross-sectional view of a bag filled with the configuration shown in FIG. 9 with the overlapping side edges. When the side edges of the plastic material overlap, the overlapping portions may be sealed to form a closed periphery. The overlapping portions may be sealed in a variety of manners such as heat sealing, ultrasonic welding, adhesive sealing, or stapling. The rollers or wheels provided beneath the tunnel ensure that the plastic material will be pulled beneath the material being bagged so that the plastic material will form the bag-like enclosures of FIGS. 17 and 18.

Figure 12:
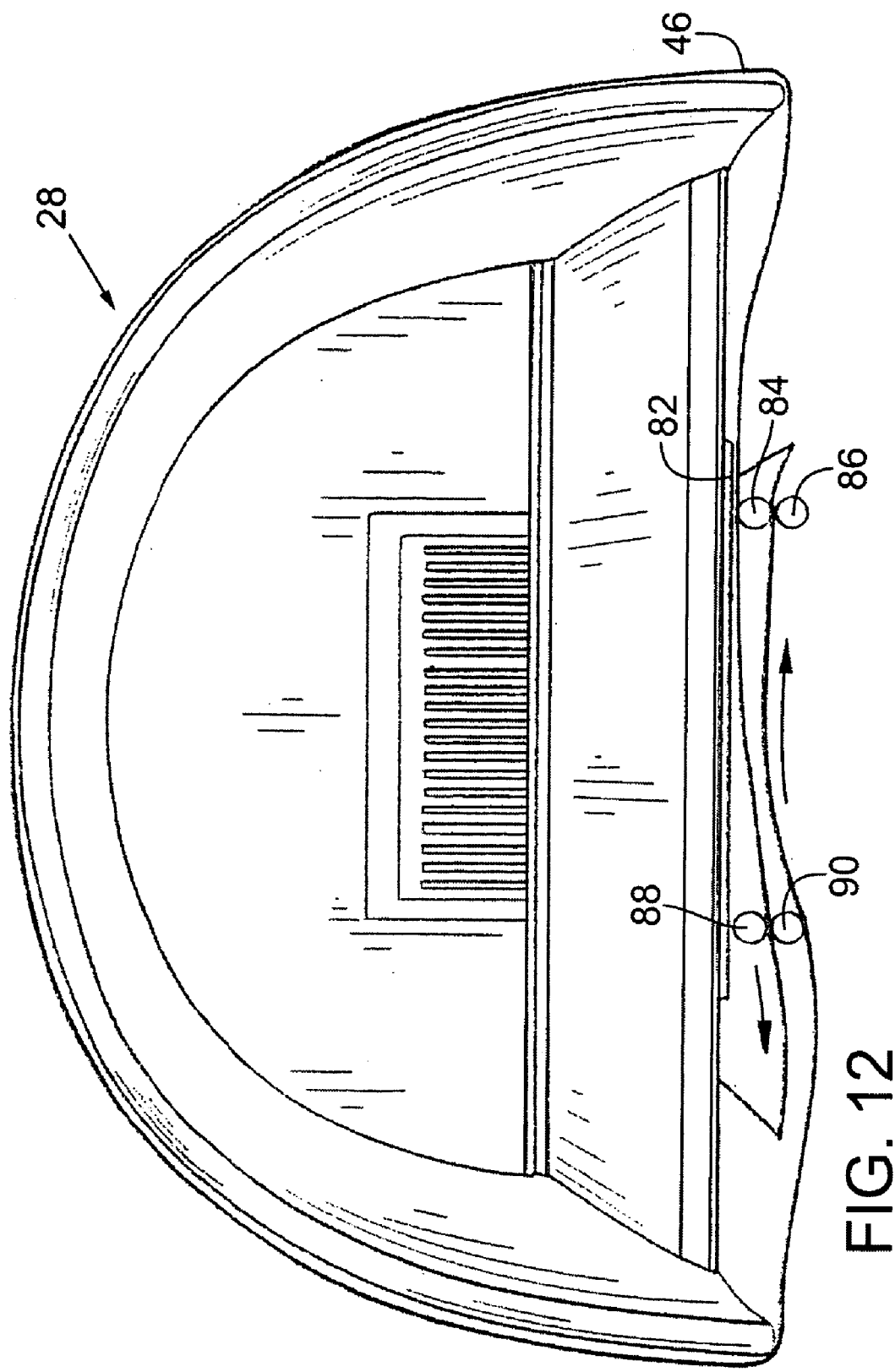
FIG. 12 is a rear view of the embodiment of FIG. 11.

The plastic material 46 beneath the tunnel 28 may be guided towards the centerline of the tunnel 28 through other plastic material guiding assemblies, one example of which is shown in FIGS. 11 and 12. In the embodiment of FIGS. 11 and 12, a protective tongue or shield 82 extends rearwardly from bottom wall 38 of tunnel 28. Elongated rollers 84 and 86 are rotatably mounted beneath tongue 82 with the peripheries thereof being in engagement with each other. A pair of elongated rollers 88 and 90 are also rotatably mounted beneath tongue 82 with the peripheries thereof being in engagement with each other. As viewed in FIG. 12, rollers 84 and 90 are driven in a counterclockwise direction and rollers 86 and 88 are rotated or driven in a clockwise direction by any suitable means. The coordinated rotation of rollers 84, 86, 88, and 90 move the opposing side edges of the plastic material in opposing directions moving the side edges toward the centerline of the tunnel 28.

Figure 15:
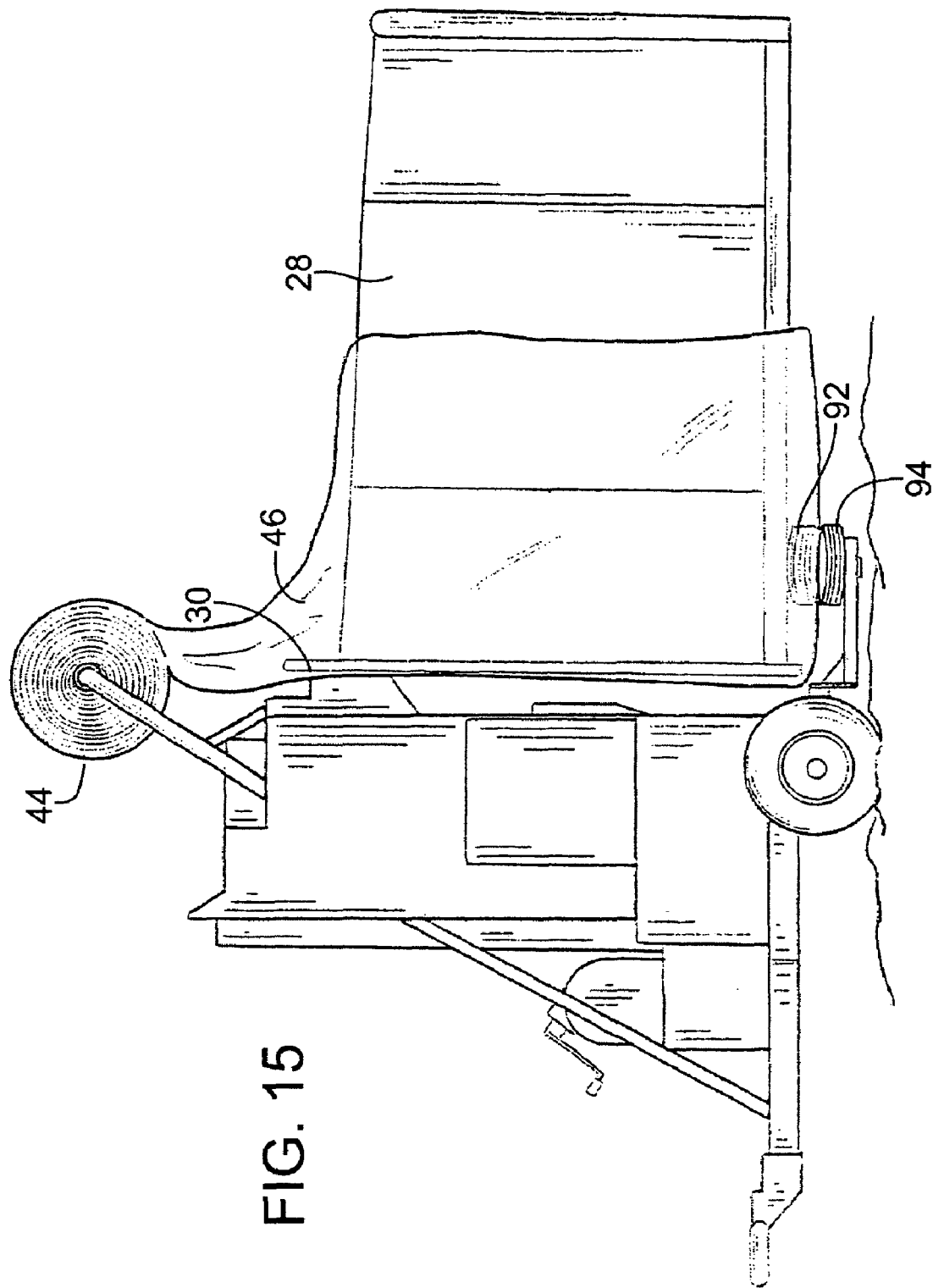
FIG. 15 is a side view illustrating an example of the guide assembly according to the present disclosure.
Figure 16:
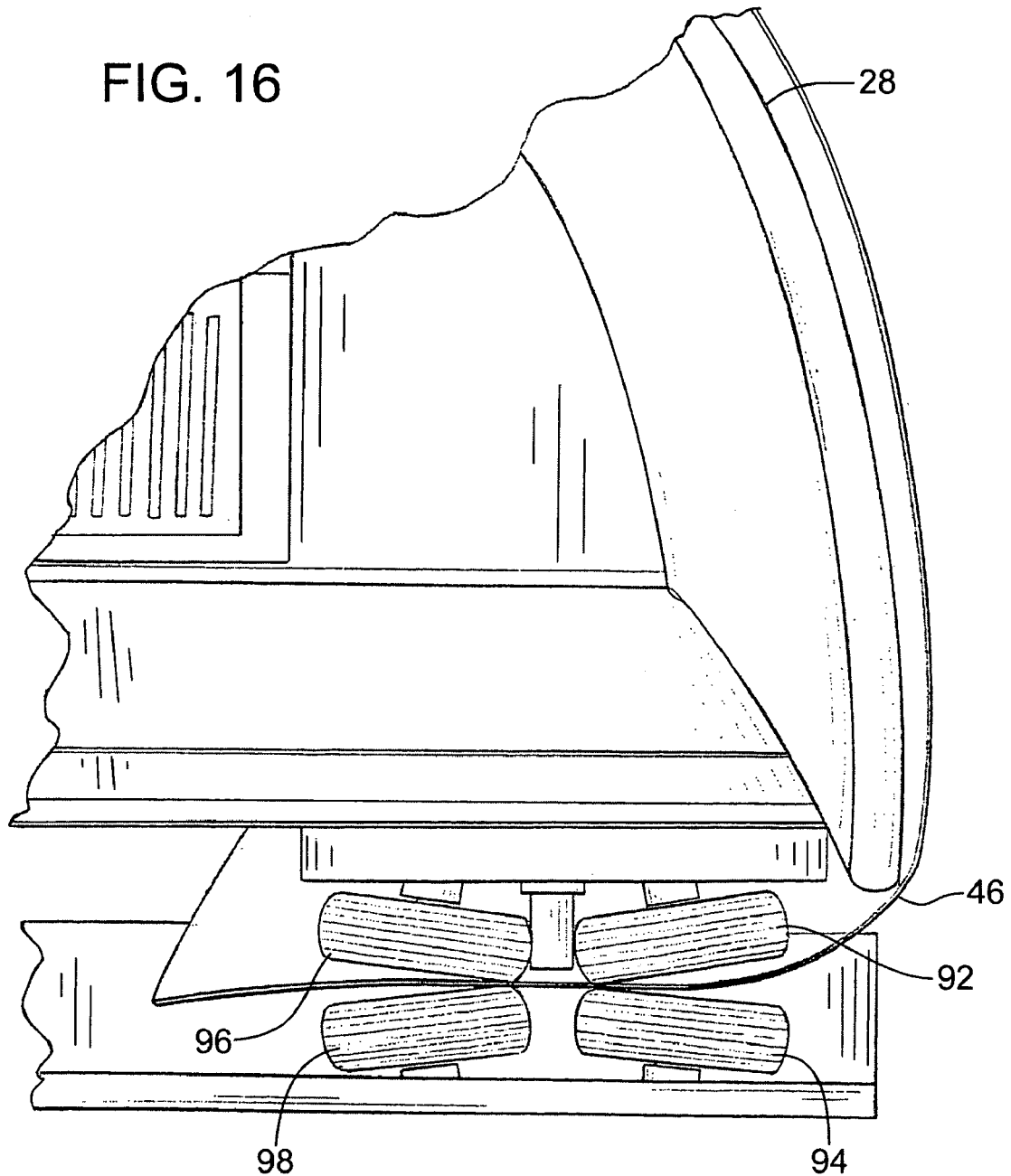
FIG. 16 is a rear view of the embodiment of FIG. 15.

Another example of an assembly for guiding the plastic material 46 beneath the tunnel 28 towards the centerline of the tunnel is illustrated in FIGS. 15 and 16. In the embodiment of FIGS. 15 and 16, rotatable wheels replace the rollers of FIGS. 7–9. A pair of small wheels 92 and 94 replace the rollers 74 and 66 and a pair of small wheels 96 and 98 replace the rollers 76 and 68. Similarly, although not illustrated, a pair of small wheels 92' and 94' replace the rollers 80 and 82 and a pair of small wheels 96' and 98' replace the rollers 78 and 70. Although four pairs of small wheels are shown, any number of pairs of wheels could be utilized. Wheels 92, 96 and 92', 96' are rotatably secured to floor 38 while wheels 94, 98 and 94', 98' are rotatably secured to pan 64 or other suitable support. Wheels 92, 94 are in engagement with one another, as viewed in FIG. 16, with driven wheel 92 being in engagement with wheel 94. Wheel 92 is rotatably driven by any convenient means so that rotation of wheel 92 also causes wheel 94 to be rotatably driven. The peripheries of wheels 96 and 98 are in engagement with one another in the same manner as wheels 92 and 94 with wheel 96 being driven thereby also causing wheel 98 to rotate. Wheels 92', 94', 96' and 98' are similarly mounted and driven.

FIGS. 13A and 13B illustrate a sizing assembly to adjust the diameter of the bag formed by the plastic material as it passes over the tunnel. In FIGS. 13A and 13B, a substantially U-shaped member 100 having a shroud 101 secured thereto extends around the tunnel with the plastic material passing thereover. The member 100 and the rearward end of shroud 101 are selectively vertically adjusted by an adjustment means 101A (FIG. 13B) to adjust the size of the shroud and the bag formed by the plastic material passing thereover.

Figure 14B:
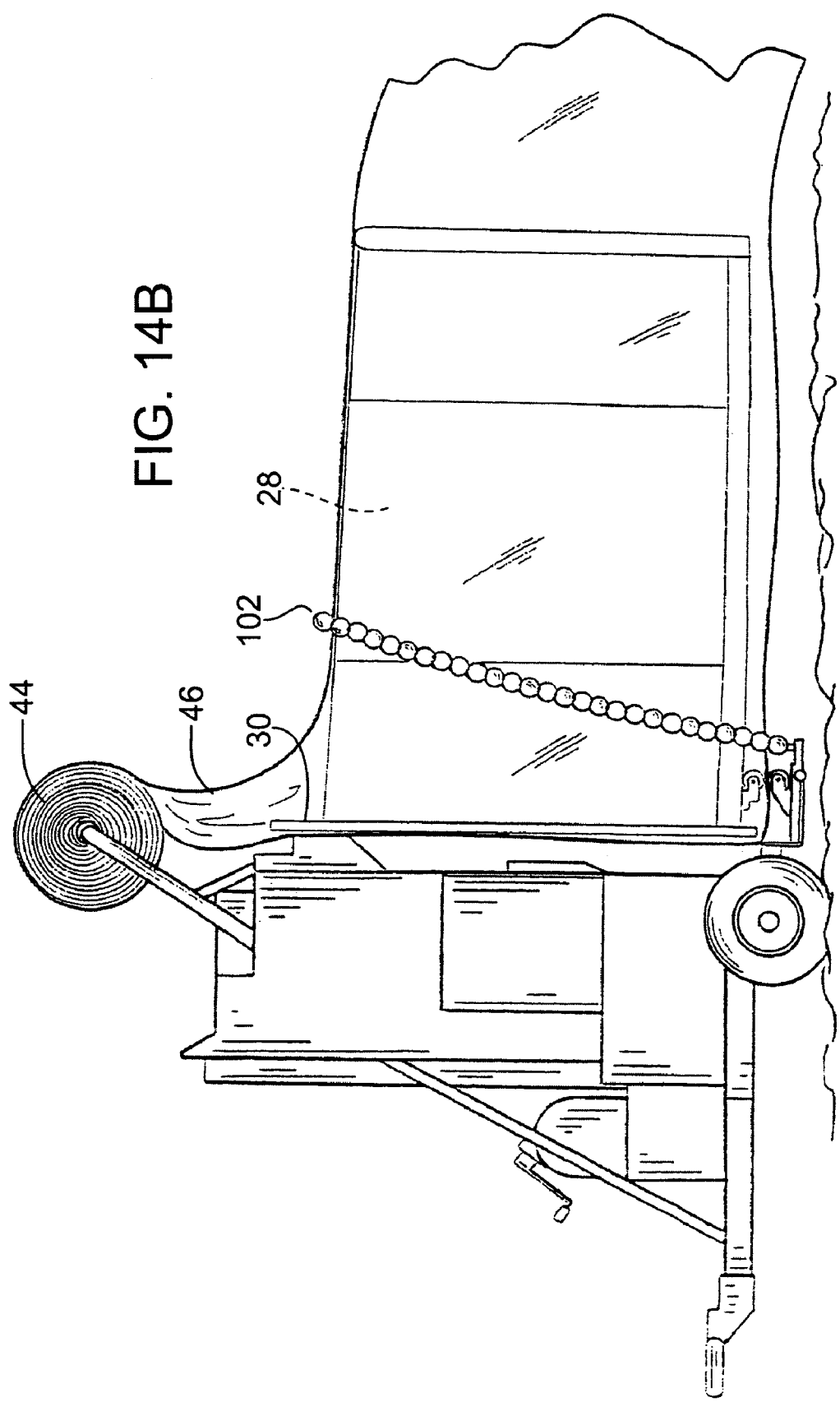
FIG. 14B is a side view of the embodiment of FIG. 14A.

FIGS. 14A and 14B illustrate a smoothing assembly to smooth out wrinkles that may be present in the plastic material as it passes around the tunnel. In FIGS. 14A and 14B, a plurality of balls or rollers 102 are rotatably mounted on a flexible cable 104 or the like with the balls or rollers 102 being in engagement with the exterior surface of tunnel 28. The rotation of the balls smoothes out the plastic material as the plastic material passes between the balls and the tunnel.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Where the disclosure or subsequently filed claims recite "a" or "a first" element or the equivalent thereof, it should be within the scope of the present inventions that such disclosure or claims may be understood to include incorporation of one or more such elements, neither requiring nor excluding two or more such elements.

Applicant reserves the right to submit claims directed to certain combinations and subcombinations that are directed to one of the disclosed inventions and are believed to be novel and non-obvious. Inventions embodied in other combinations and subcombinations of features, functions, elements and/or properties may be claimed through amendment of those claims or presentation of new claims in that or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A method of bagging material, comprising the steps of:
providing a mobile bagging machine having rearward and forward ends and a rearwardly extending tunnel;
positioning a roll of tubular plastic material on said bagging machine;
causing said tubular plastic material to unroll from said roll as material is forced through said tunnel;
slitting said tubular plastic material so as to create a sheet material having opposing side edges; and
passing said sheet at least partially around said tunnel to at least partially enclose the material being discharged from said tunnel.

2. The method of claim 1 wherein the material being at least partially enclosed comprises organic material.

3. The method of claim 1 wherein said sheet forms a bag-like enclosure in which the material is placed.

4. The method of claim 3 wherein said side edges of said sheet are positioned below the material in a horizontally spaced-apart manner.

5. The method of claim 3 wherein said side edges of said sheet are positioned below the material in the bag-like enclosure in an overlapping manner.

6. The method of claim 5 wherein said overlapping side edges of said sheet are sealed together.

7. The method of claim 1 wherein said roll is positioned above said tunnel.

8. The method of claim 1 further comprising the step of passing the sheet material through a guide assembly operatively coupled to the tunnel.

9. The method of claim 8 wherein the guide assembly is adapted to draw the opposing side edges of the plastic material toward a centerline of the tunnel.

10. The method of claim 1 wherein the material being at least partially enclosed by the plastic material includes at least one of agricultural material, silage material, waste material, or compost material.

11. A bagging machine for bagging material, comprising:
a mobile frame having rearward and forward ends;
a rearwardly extending tunnel operatively coupled to the mobile frame;
a roll of tubular flexible plastic material mounted on said mobile frame; and
a slitter operatively coupled to said mobile frame and adapted to slit said tubular plastic material as it is pulled from said roll as the bagging machine moves forwardly during the bagging operation to create a sheet having opposite side edges, wherein said sheet of flexible plastic material passes at least partially around said tunnel to at least partially enclose the material being discharged from said tunnel.

12. The bagging machine of claim 11 wherein said roll of flexible plastic sheet material is rotatably mounted on said mobile frame means.

13. The bagging machine of claim 11 further including a plastic material guide assembly.

14. The bagging machine of claim 13 wherein said plastic material guide assembly positions said opposing side edges of said plastic material beneath said tunnel.

15. The bagging machine of claim 13 wherein said plastic material guide assembly positions said opposing side edges of said plastic material beneath said tunnel in a horizontally spaced-apart relationship.

16. The bagging machine of claim 13 wherein said plastic material guide assembly positions said opposing side edges of said plastic material beneath said tunnel in an overlapping relationship.

17. The bagging machine of claim 13 wherein said plastic material guide assembly comprises guide rollers.

18. The bagging machine of claim 17 wherein said guide rollers are driven.

19. The bagging machine of claim 13 wherein said plastic material guide assembly comprises guide wheels.

20. The bagging machine of claim 19 wherein said guide wheels are driven.

21. The bagging machine of claim 13 wherein said plastic material guide assembly is positioned beneath said tunnel.

22. The bagging machine of claim 11 wherein the material being at least partially enclosed by the plastic material includes at least one of agricultural material, silage material, waste material, or compost material.

* * * * *